United States Patent

Nasser, Jr. et al.

(10) Patent No.: US 6,673,245 B2
(45) Date of Patent: Jan. 6, 2004

(54) USE OF SURFACE-ACTIVE AGENTS IN THE IMPURITY REMOVAL PROCESS FROM SOLUTIONS CONTAINING ACETIC DERIVATIVES USING NANO-FILTRATION WITH MEMBRANES, IN A PROCESS TO OBTAIN CELLULOSE ACETATE

(75) Inventors: Roberto Nasser, Jr., São Paulo (BR); Aires Iacovone, São Paulo (BR)

(73) Assignee: Rhodia Acetow Brasil LTDA, Santo Andre (BR)

( * ) Notice: Subject to any disclaimer, the term of this patent is extended or adjusted under 35 U.S.C. 154(b) by 49 days.

(21) Appl. No.: 10/046,906

(22) Filed: Jan. 17, 2002

(65) Prior Publication Data

US 2002/0148768 A1 Oct. 17, 2002

Related U.S. Application Data

(63) Continuation of application No. PCT/BR00/00034, filed on Apr. 18, 2000.

(30) Foreign Application Priority Data

Jul. 20, 1999 (BR) .............................................. 9904569

(51) Int. Cl.[7] .............................................. B01D 61/00
(52) U.S. Cl. ...................... 210/652; 210/651; 210/705; 210/729; 210/739; 536/63
(58) Field of Search ................................ 210/652, 651, 210/639, 705, 729; 536/63

(56) References Cited

U.S. PATENT DOCUMENTS

| | | | |
|---|---|---|---|
| 4,269,972 A | * | 5/1981 | Yabune et al. |
| 4,812,240 A | | 3/1989 | Watts .......................... 210/639 |
| 4,948,512 A | | 8/1990 | Gotlieb et al. .............. 210/705 |
| 5,973,139 A | * | 10/1999 | Lee et al. |

FOREIGN PATENT DOCUMENTS

| | | |
|---|---|---|
| BR | 9501370 | 8/1997 |
| DE | 41 25 331 | 2/1993 |
| JP | 5131190 | 5/1993 |

* cited by examiner

*Primary Examiner*—Ana Fortuna
(74) *Attorney, Agent, or Firm*—Wood, Herron & Evans, L.L.P.

(57) ABSTRACT

This invention refers to the use of surface-active agents as a treatment of effluents containing acetic derivatives by tangential filtration characterized from aqueous solutions containing between 20 and 35% in weight of acetic derivatives having been optionally decanted and filtered in a conventional manner in order to remove suspended impurities, which undergo the addition of one or more surface-active agents, while submitted to the tangential filtration process via polymer membranes, the cutting range of which may vary between 0.001 and 0.005 microns and feed pressure which may vary between approximately 1 and 50 barg, being that at least one of the surface-active agents present a component chosen from the lignosulfonates containing a monomeric unit indicated by the formula:

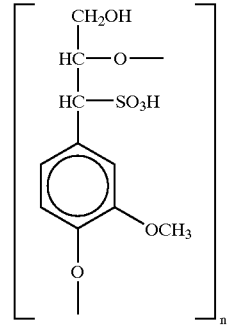

6 Claims, 4 Drawing Sheets

SCHEMATIC REPRESENTATION OF THE PHENOMENA THAT OCCUR IN THE REGION NEIGHBORING THE MEMBRANE.

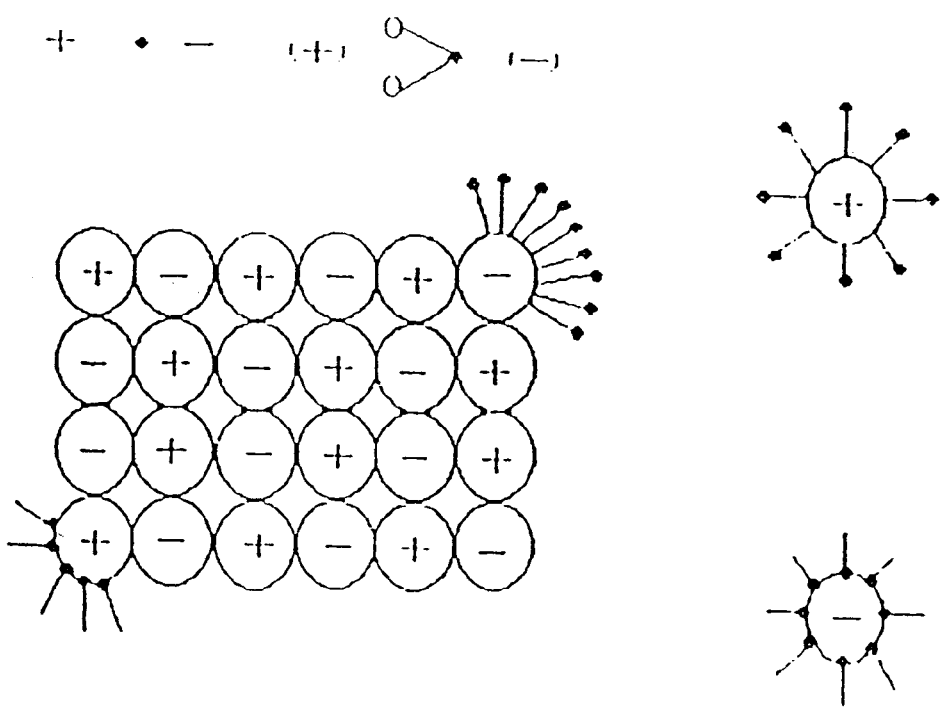
FIGURE 1 - IONIC COMPOSITION
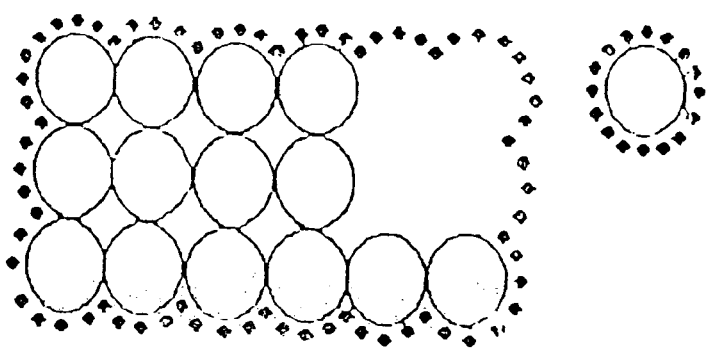
FIGURE 2 - NON-IONIC COMPOSITION

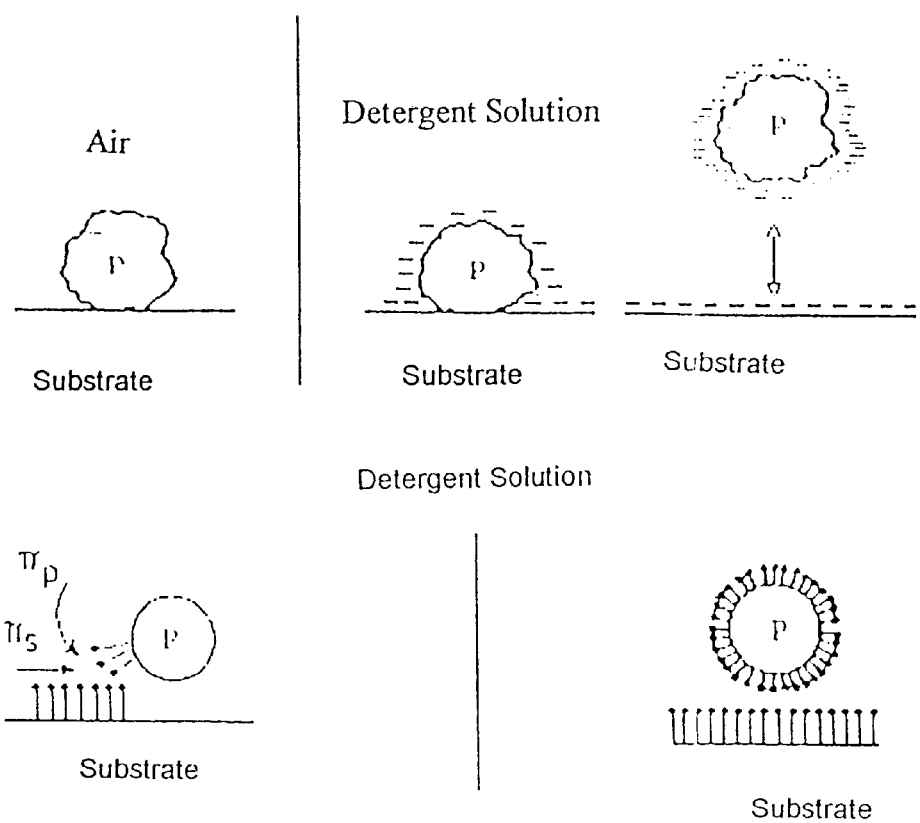
FIGURE 3 - INSOLUBLE PARTICLES

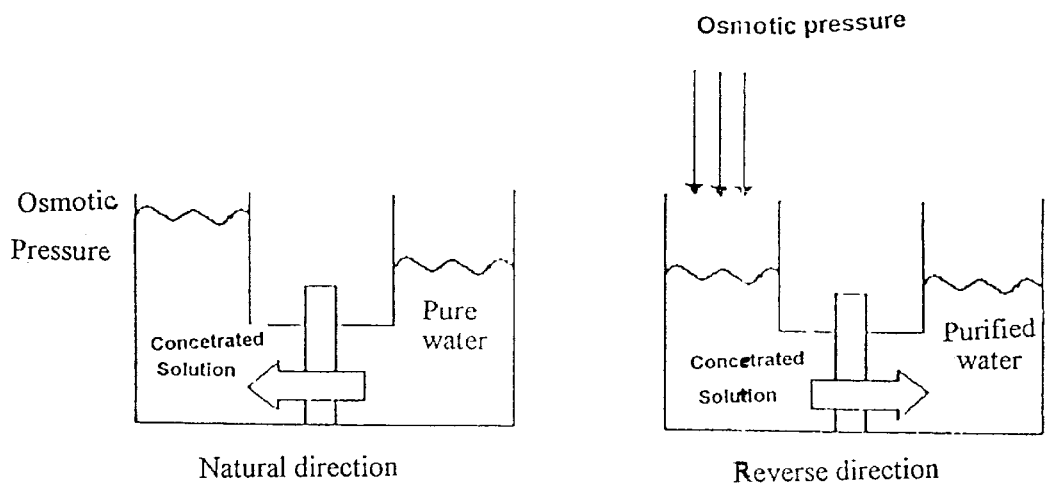
FIGURE 5 - FILTRATION THROUGH SEMI-PERMEABLE MEMBRANES
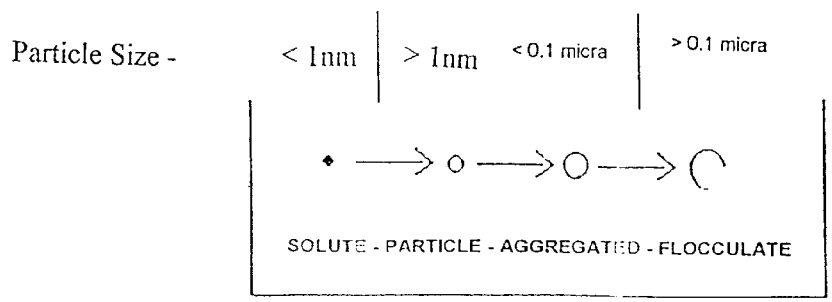
Classification - True solution - Colloidal Solution - Suspension
Separation Process - (Distillation) - (Nano-filtration) - (Filtration)
FIGURE 4 - STAGES OF INSOLUBILIZATION

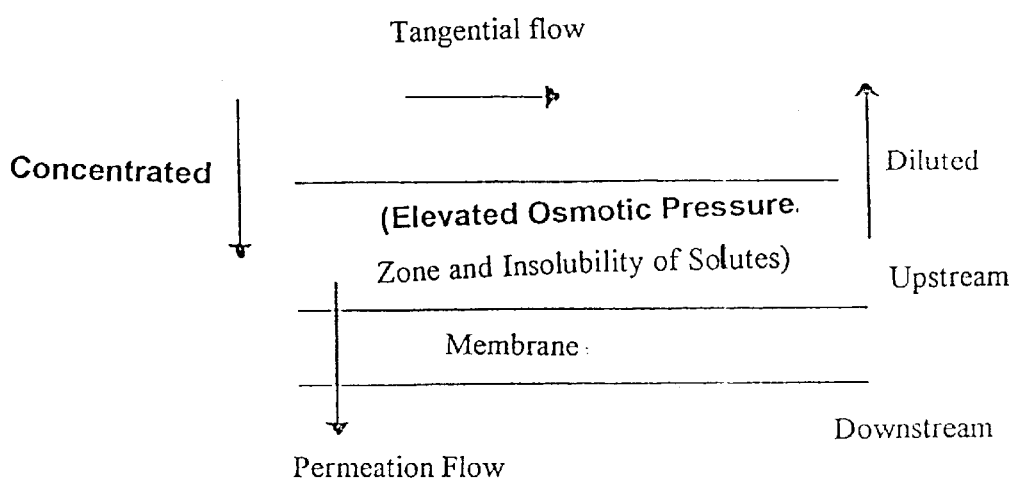
FIGURE 6 - SCHEMATIC REPRESENTATION OF THE PHENOMENA THAT OCCUR IN THE REGION NEIGHBORING THE MEMBRANE.

USE OF SURFACE-ACTIVE AGENTS IN THE IMPURITY REMOVAL PROCESS FROM SOLUTIONS CONTAINING ACETIC DERIVATIVES USING NANO-FILTRATION WITH MEMBRANES, IN A PROCESS TO OBTAIN CELLULOSE ACETATE

CROSS-REFERENCE TO RELATED APPLICATIONS

This application is a continuation of PCT Application No. BR 00/00034 filed Apr. 18, 2000, and designating the United States, which claims priority to Brazilian Patent Application No. PI 9904569-9 filed Jul. 20, 1999, the specifications of which are hereby incorporated by reference herein in their entireties.

FIELD OF THE INVENTION

This is invention relates to an improved process of volumetric reduction of what is retained in effluent treatment processes containing acetic derivatives submitted to a tangential filtration, through the use of surface-active agents chosen from among lignosulfonates, particularly those originating from processes for the obtainment of cellulose acetate.

BACKGROUND OF THE INVENTION

The conventional process of cellulose acetate obtainment, known by those skilled in the art, contains simplified stages of: acetylation of the cellulose paste, saponification, concentration, precipitation, washing, pressing, and drying. The cellulose acetylation reaction usually occurs in an acetic environment and with an excess of the reagent—acetic anhydride, which is also hydrolysated to acetic acid. This solution of acetic acid, in addition to other obtained throughout the process, as for example, the solution that is obtained through the washing stage of the cellulose acetate, is what particularly relates to this invention. Or rather, the production of cellulose acetate results in the generation of an appreciable quantity of an aqueous solution containing 20 to 35% weight of acetic acid, which is absolutely necessary for recovering the acetic acid, of a high aggregated value, so as to make the production of cellulose acetate economically feasible.

This aqueous solution of 20 to 35% by weight of acetic acid obtained during the manufacturing of cellulose acetate contains organic impurities, mainly cellulose acetates and hemicelluloses, in suspension and in solution, which should be eliminated, in order to make the recovery of the acetic acid possible, as the presence of the impurities results in a foam or encrustation in the recovery columns, impairing the operation and increasing the frequency of stoppage for maintenance and cleaning.

It is important to stress the presence of the sulfuric acid that contaminates the acetic acid solution under study, as the same is used as a catalyst in the reactions of acetylation and hydrolysis. Usually, the concentration of sulfates, in the aqueous solution of acetic acid, 20 to 35%, resulting from the cleaning of the precipitated cellulose acetate, is on the order of 1000 ppm. The organic impurities and others in suspension are generally eliminated physically, through a separation process, which may be conventional filtration, obtaining a clear solution; and the organic impurities in solution are generally treated through warm hydrolysis, using the sulfuric acid to break the long sequences of hemicelluloses. By that treatment, the impurities continue to be present, but with molecular dimensions or weights that are much lower, in addition to requiring large retention times—on the order of 15 to 24 hours, resulting in large dimensioned equipment. The temperatures required for the activation of the hydrolysis reaction are higher, on the order of 90° C., which results in the higher consumption of steam, maintenance and operational problems.

The largest problem of this process is the increase in the concentration of sulfates in the acetic acid solution, that after hydrolysis, becomes 3500 ppm. This elevated degree of sulfates creates an environmental problem, as the water contained in the aqueous solution of acetic acid that constitutes the effluent of the recovery unit of the acetic acid, shall drag the sulfates contained after the hydrolysis through the environment, in a concentration of between 6000 and 7000 ppm. Another negative consequence of the elevated degree of sulfate to the exit from the hydrolysis is the chemical attack on the equipment of the acetic acid recovery unit, increasing the frequency of maintenance and consequently, its costs, requiring an attempt to diminish the frequency of maintenance, the use of high quality construction materials.

The hydrolysis is verified in the treated current, through a foam test, or rather, in the hydrolyzed solution, there should not be any foam. The absence of foam guarantees a controlled operation in the recovery columns of the acetic acid. However, the hydrolysis does not contribute to the reduction of maintenance problems or the plant shut downs, as the hydrolyzed impurities generate other impurities, that also becomes encrusted on the equipment, or rather, the impurities, continue to be present in the acetic acid solution; the acid hydrolysis simply transforms the original organic impurities, hemicelluloses and cellulose acetate in its majority, into other impurities, that due to the lower molecular weight, length of the sequence, or any other chemical characteristic, does not generate foam, allowing operations to be more controlled.

BRIEF DESCRIPTION OF THE FIGURES

FIG. 1 shows the solubilization of an ionic compound by water;

FIG. 2 shows the solubilization of a non-ionic compound by a solvent;

FIG. 3 shows the solubilization of an insoluble particle in a solvent system;

FIG. 4 show the stages of insolubilization and summarizes the classification and separation process of the solutions;

FIG. 5 shows the filtration processes that separate solute from solution by forcing the solvent to flow through a membrane by pressure higher than the osmotic pressure of the solution; and FIG. 6 is a schematic representation of phenomena that occur in the regions neighboring the membrane.

DETAILED DESCRIPTION OF THE INVENTION

In order to resolve this problem, the Applicant developed a process described in BR patent 9501370-9, for the removal of impurities using membranes for tangential filtration in the conditioning of acetic acid solutions in processes for obtaining cellulose acetate, from aqueous solutions of 20 to 35% in weight of acetic acid, previously decanted and filtered in a conventional manner to withdraw the suspended impurities containing hemicelluloses, its derivatives, and other impurities in the solution, which are eliminated by a tangential filtration process via polymeric membranes, whose cut may approximately vary between 0.001 and 0.005 microns and feed pressure which may approximately vary between 1 and 50 barg, but preferably between 5 and 25 barg. Solutions are heterogeneous systems formed by solvents and solutes. Depending on the size of the particles of the solutes, the solutions may be classified as suspensions, colloidal solutions, and true solutions. The diameter of the particles of the suspension is higher than 0.1 microns, which may be seen with the naked eye and separated by conventional frontal filtration. When the size of the particle is less than 0.1 microns, but superior to one nanometer (nm), the solution is called colloidal. In that case, the particles may not be seen by the naked eye and may not be separated using conventional frontal filtration, but may be separated by ultra or nano-filtration through semi-permeable membranes. A solution is called true when the diameter of its particles is smaller than one nanometer and its components may only be separated by changing its state, in this case, the dissolution occurs at a molecular or atomic level.

The maximum concentration that may be reached in a stable equilibrium with a free solute at a certain temperature is called solubility. When a substance dissolves and reaches solubility, the process stops, but the number of particles that dissolve and the particles that regress to the separated substance are equal. The solubilizing process occurs in various manners that depend on the force of cohesion between the solutes and solvents, that may have origin in chemical bonds, electrical forces, and polarity, among others. Generally the solvent encircles the solid solute and attracts it with a force that is superior to the force of cohesion of the solid particles among themselves. Once separated, the particles are encircled by the solvent and solubilized. FIGS. 1, 2, and 3 attached hereto, respectively show the solubilization of one ionic compound by water, of a non-ionic compound by a solvent, and solubilization of an insoluble particle in a solvent system, due to the interaction with a surface-active agent and electrical charges.

A solution may be diluted, concentrated, saturated, or supersaturated, in accordance with the concentration of the solute. It is diluted when the concentration of the solute is much lower than its solubility; concentrated when the concentration of the solute is close to its solubility but the solution still accepts solute; saturated when the concentration of the solute coincides with its solubility; and supersaturated when it contains more solute than indicated for solubility in a stable equilibrium. FIG. 4 attached hereto shows the stages of insolubilization and summarizes the classification and separation process of the solutions.

The compounds of a solution present an intrinsic mobility that makes it with the components, collide with one another and move form one place to another in a continuous manner, giving rise to the diffusion process. This diffusion process that occurs in the solution, may also occur through a membrane that is in contact with the solution. If this membrane is semi-permeable, that may be breached by the solvents but not by the solutes, it may be used to concentrate the solutes until its solubility is reached.

The semi-permeable membranes impede dynamic flow, so that the transportation through the membrane occurs through sorption of the permeating molecules on the face of the membrane upstream, their diffusion through the membrane and desorption in the phase of the membrane downstream (see FIG. 6 in attachment). The plasticizing action of the solvent on the membrane causes its swelling leading to the formation of a microporous gel that permits the diffusion of the molecules through the membranes. The porosity of the membrane and the size of the pores that govern the selectivity and speed of transportation, may be controlled up to a certain point with swelling agents.

The electric interaction may also be important in the alteration of the membrane permeability and in the transfer coefficient when the solution contains electrolytes and the membrane contains electrical charges.

The filtration processes that separate the solute from the solution forcing the solvent to flow through a membrane through an act of much higher pressure than the osmotic pressure of the solution, as shown in FIG. 5 attached hereto, are processes that differently from the distillation and crystallization process, operate at room temperature and without any phase change. The permeation flows may decrease over time due to the blocking of the pores of the membrane by solute molecules that have dimensions that are close to those of the pores, that provoke a clog and the formation of pies. The formation of pies may also occur due to the insolubility of the solute. The separation of the suspended solids in high concentrations is feasible when an elevated speed is used that impedes the formation of pies on the membrane. In the majority of cases, the presence of suspended solids is harmful to the operation of the membrane and should be avoided.

Another factor that affects the true permeation flows is the concentration gradient of the solution that occurs in the region neighboring the membrane. The increase of the concentration of this region implies an increase in the osmotic pressure of the solution, that reduces the differential of the pressure that impels the solvent through the membrane. In this region the flow speed in the limit also tends towards zero, the phenomena described become more intense. It is in this region as well that the insolubility process starts as shown in FIG. 6 attached hereto.

With the objective of avoiding problems that have been outlined and in order to obtain a new treatment process for effluents containing acetic derivatives by tangential filtration that:

presents a better performance than the process described in BR 9501370-9;

presents maximum volumetric reduction of the retained, avoiding the formation of pies;

maintain the purity of the permeate with regards to what is obtained in BR 9501370-9;

represent a solution that does not burden the final cost of the process;

does not use toxic products, but rather biodegradable or natural products;

the Applicant developed a perfected process that uses the addition of one or more surface-active agents or surfactants, being at least one chosen from among the lignosulfonates.

The use of additives of surface-active agents that act as colloidal protectors, dispersing agents, and emulsifying agents in addition to avoiding the appearance of precipitates according to the scheme shown in FIG. 4 attached hereto, aid in the reduction of the thickness of the high concentration layers that form on the walls of the membrane.

Said surface-active agents are adsorbed on the surface of the particles, promoting the electrostatic repulsion between the particles with the same charge, preventing an agglomeration, reducing the growth of the particles, inhibiting the formation of bonds between the particles making them more hydrophilic and less adherent to surfaces. Thus these surface-active agents affect the particle to particle to surface interactions.

The lignosulfonates are polymers derived from lignin, obtained as a by-product from the wood pulp and paper industry, via a sulfite process. These polymers possess molecular weights that vary between 1000 and 14000. They are formed from monomeric units of the phenylpropane type having molecular weights between 215 and 256, approximately 15% of which are due to the sulfonate group (—$SO_3H$).

Various components of the black sulfitic liquor may be present in the lignosulfonates available on the market as shown in the data below:

| Component | % total of solids |
|---|---|
| Lignosulfonate | 42–55 |
| Hexoses | 5–14 |
| Pentoses | 6–20 |
| Non-celuloic carbohydrates | 8–11 |
| Acetic and formic acid | 4–9 |
| Resins and extracts | 1–2 |
| Ash | 10 |

Various methods have been developed in order to isolate and purify the lignosulfonates of the black sulfitic liquor. One of the oldest and more widely used in the industrial field is the Howard process, in which the calcium lignosulfonate is precipitated from the black sulfitic liquor by the excessive addition of lime. Another industrial method includes ultra-filtration.

Purified and modified lignosulfonates exist on the market, which have substantially reduced impurity levels, presenting:

| % Dry Base | Specification |
|---|---|
| pH (10% solution) | 7.5–3.5 |
| Humidity (to 105° C.) | Max. 6.0% |
| Ashes (800° C.) | Max. 20% |
| Calcium | Max. 0.3% |
| Magnesium | Max. 1.8% |
| Iron | Max. 0.1% |
| Total reducing sugars | Max. 20% |
| Insoluble in water | Max. 0.2% |

Large volumes of lignosulfonates are used as agglomerates in granulated animal feed, water reducing agents in concrete mixtures, dispersing agents in the manufacturing of plaster plates, fluid loss control agents and anti-thickener for perforation sludge, grinding aids, and dispersion in the manufacturing of cement and the application in dust control, particularly in highways.

Lignosulfonates are employed in small volumes: in the treatment of boiler water and cooling towers in order to prevent the deposition of encrustations. In this system, the lignosulfonates capture hard salts and thus avoid their deposition on metallic surfaces. They also may prevent the precipitation of certain congealing particles, that are made insoluble by the heat.

The lignosulfonates are also used: in the manufacturing of paints and colorants as primary dispersing agents, charge, colloidal protectors, and grinding aids; in the formulation of industrial cleaning agents, they act as dispersing agents for dirt and suspension agents; in the manufacturing of agricultural formulas with micronutrients; in the obtainment of iron complexes, copper, zinc, manganese, magnesium, and boron. In the majority of such complex application examples, they are used as foliar fertilizers that may be promptly absorbed by the plants without the inconvenience of burning the plant leaves and in the treatment of soils where complex micronutrients are maintained for a long period of time.

No reference relating to the employment of lignosulfonates as a surfactant or surface-active agent was found in the state of the art, for reducing the volume of the concentrate in tangential filtration processes, particularly in a process originating from the manufacturing of cellulose acetate.

The Applicant developed a process employing one or more lignosulfonates as surface-active agents, which present the following advantages with regards to other surface-active agents known by those skilled in the art:

they are non-toxic (in the majority of cases, the $LD_{50}$ values are higher than 5 g/kg);

they are abundant and come from a renewable raw-material source (that does not burden the final process charge);

impermeable, remaining in the concentrate or retained and resulting in greater purity of the permeate;

remain stable in the retained (stable in the pH of the process);

perfect in environmental terms (not pollutants);

hold a low tendency to reduce the inter-surface tension between the liquids and to form micelles.

Another advantage of this process is the reduction of the sulfate in the permeated solution, thus improving its degree of purity, processability, and environmental potential.

The Applicant developed the use of surface-active agents in the removal process of solution impurities containing acetic derivatives using nano-filtration with membranes, in the obtainment process of cellulose acetate characterized by originating from aqueous solutions containing between 20 to 35% in weight of acetic derivatives, having been optionally decanted and filtered in a conventional manner in order to remove suspended impurities, which undergo the addition of one or more surface-active agents when submitted to the tangential filtration process via polymer membranes, whose cutting range may vary between approximately 0.001 and 0.005 microns and feed pressure which may vary between approximately 1 and 50 barg, being that at least one of the surface-active agents presents a component chosen from among the lignosulfonates.

The lignosulfonates preferably employed preferentially present monomer units, pursuant what is indicated below:

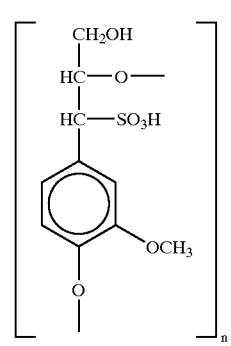

which may be employed in the mono or bivalent forms.

The physicochemical parameters depend on the type of membrane employed, particularly for the ultra-filtration and nano-filtration processes, more preferentially nano-filtration with a feed pressure between close to 5 and 25 barg. This process may conveniently be applied in the treatment of effluents arising from the cellulose acetate obtainment process, that presents acetic derivatives of the acetic acid type or derivatives thereof.

Another surprising result obtained through the invention was the diminishing by 60% of permeation of impurities such as the sulfate, with regards to the process described in BR 9501370-9, lowering it to 40% of the sulfate in the permeate against approximately 90% of the permeate in the basic process.

To follow are some examples that shall serve to better elucidate the invention, which should not be taken as limiting effects of the invention.

EXAMPLES

Introduction

In order to understand the examples, it is initially necessary to understand the origin of the contaminates contained in the effluent acetic acid current; the initial and most important stage of the production process of cellulose acetate is the reaction of the cellulose acetylation by the acetic anhydride, in an acetic acid environment. As cellulose is a natural product, therefore subject to variations in composition, the cellulose acetate produced, in order to be compliant with the spinning of the acetate chain should have a well defined degree of combined acetic acid (acetic titer). However, due to the variations in the raw materials, as well as the variability in the productive process, the acetic titer may vary around this average; however lower the standard deviation of the distribution around this average, the better shall be the product quality for spinning that should have the minimum content of impurities or contaminants, that should consequently be destined for the current in question, obtained specifically in the stage of washing the cellulose acetate. This should be the Production objective, this is, to minimize the fluctuations of the stages with reaction, so as to minimize the standard deviation of the acetic titer variation, which results in the precipitation of a good quality product, minimizing the filtration problems of the colloid and spinning, but, carrying contaminants (inferior cellulose acetates) the aqueous solution of effluent acetic acid, obtained in washing, that should be adequate for the recovery of acetic acid through the removal of contaminates for the use of the nano-filtration process.

The understanding of the existing commitment between the quality of the cellulose acetate produced in order to minimize problems in the filtration stages of the colloid and spinning, with the quantity of contaminants always present in the aqueous solution of cellulose acetate, explains and justifies the employment of the nano-filtration process as a clean and efficient means for the definitive removal of these contaminants.

Further aiming at a better understanding of the examples, there is the need to well define some key terms contained in the descriptive text of the example, the description of which are indicated by italics.

Effluent Acetic Acid—is the current that is to be treated by the process in question, presenting a concentration of between 20 and 35% by weight; obtained in the washing stage of the cellulose acetate, being previously decanted in continuous decanters and filtered in Scheibler filters, where the suspended contaminants are eliminated. The contaminants are the hemicelluloses of the inferior cellulose acetates, being that the current that fees the nano-filtration unit, purpose of the trials, described as examples, contain this contaminate in solution.

Batch—a method by which to operate a pilot unit, in which there is no entrance into the current in question into the feeding tank, while its content is concentrated, by the return of the retained of the membrane, and the permeate is withdrawn from the system. In this trial method, the concentrated volume contained in the feeding tank diminishes with the trail progress, terminated by hydraulic limitation, this is, a much lower liquid level in the feeding tank, making the feed of the module impossible through the pump, which cavitates.

Modified Batch—a method of operating the pilot unit, in which there is a continuance current entrance in question into the feeding tank, for which the current of the retained of the membrane recycles, while the permeate is continuously withdrawn from the system. In this trial method, the volume of the concentrate in the feeding tank is constantly maintained, and consequently, the level of the feeding tank, permitting it to reach the concentration or more elevated final volumetric reductions, without hydraulic restrictions.

Concentrate—is the portion of the fluid being processed, that did not permeate the membrane. This current therefore has a higher elevated concentration of the product that is being withdrawn from the membrane. It is also identified as the rejected current, or Retained.

Concentration by Polarization—is the phenomena observed in systems using the nano-filtration process, where a gradient of the concentration is developed in the solution, draining next to the dense surface of the membrane. In conformity, the solvent flows in the direction of the membrane and permeates through it, dragging the solute with it, that is rejected by the membrane. Therefore, there is a tendency to increase the concentration of the solute on the surface of the membrane resulting in a higher concentration than that of the solution concentration further away from the membrane. This phenomena affects the permeation, which may also affect the quality of the permeate obtained.

Differential of the Pressure on the Cartridge Filter—the cartridge filter is used as protection for the membrane, mainly with regards to the presence of solids, usually originating from previous units, in this case the decantation and filtration unit, avoiding blockage that may cause damage to the membrane. In the examples, it was verified that there is no occurrence of solids originating from the previous unit, but the cartridge filter was very effective in the occurrence of precipitation. The Pressure differential on the cartridge filter was the parameter used in the examples in order to monitor the occurrence of precipitation.

Element—is the set constituted by the membrane and support; in this case, it uses spiraled elements, where the membrane is constructed on flat sheets rolled onto a reticuled support, that offers mechanical resistance to the set, which is necessary for supporting the higher pressure in order to guarantee the flow through the membrane. The reticulated membrane/support set is rolled onto a perforated central tube, through which the collection of the permeate is done.

Permeated Flow—is the volumetric outflow of the permeate through the membrane, divided by the permeation area of the membrane. Normally expressed by liters per meters squared per hour.

Feeding Flow to the Module—is the feed outflow to the permeation module, through pumping, that is the result of the sum of the flows of the permeate and concentrate. Normally expressed in liters per hour.

Hydrolysis Degree—is the effective control parameter for the trials executed, that is the measure of time of the foam deterioration, according to the method used by the Applicant in order to verify the effectiveness of the acid hydrolysis process, that is the current treatment process for the aqueous solution of effluent acetic acid, aiming at conditioning the organic impurities contained in the subsequent stage, which is, the recovery unit for the acetic acid. The method forecasts that the time necessary for the deterioration of the foam is less than 20 seconds. Description of the method:

Material—test tube of 100 ml with a lid;

Method—take 20 ml of the sample, completing the volume with 80 ml of distilled water; close the test tube and shake the mixture vigorously for 15 seconds; place the test tube on a stable support and observe the disappearance of the bubbles in the center, in such a manner that one may see the bottom of the test tube. Measure the time interval between the end of the shaking and the disappearance of the foam.

Commentary—the contaminants, constituted of inferior hemicellulose and cellulose acetates, are emulsifying agents; as the quantity of these contaminants becomes less, the less time will be needed for the foam to deteriorate;

Result—the acceptable foam deterioration time is at the most 20 seconds.

Membrane—is the separation means employed in this process, called nano-filtration, this device is constituted of an aliphatic semi-permeable organic polymer film, asymmetrical, constituted of a dense surface, non-porous, responsible for the selectivity of the process, in which the product that is wished to be dissolved, on another layer of the same product, porous, through which the dissolved product on the dense layer dissolves; for the process in question, the examples for which are described herein the membrane thickness varies between 0.001 and 0.005 microns. The motive powers for the flow through the membrane are the chemical affinity and the feed pressure of the flow, tangential to the filtering environment, being that in these cases, the pressure of the operation varies between 10 and 50 barg.

Module—the tubular covering of 1100 mm of length and 110 mm in diameter, made of PVC, measured for the feed flow, in the pressure of 70 barg. Feed input provided, located away from the center, with internal diffusing rings, in order to guarantee the uniform distribution of the feed; exit opening form the concentration, also located away from the center, located on the extreme opposite end. In this extreme, the wrapping is provided exit output of the permeate, located in the center, which fits into the perforated tube for the collection of the permeate.

Permeate—is the portion of the fluid being processed that permeate the membrane, containing a low degree of contaminates, the majority of which were removed by the membrane.

Operation Pressure—is the arithmetic average between the feed pressures and those of the exit of the two flows (concentrate and permeate) from the module. Also known as the Trans-membrane Pressure. This parameter is used in the monitoring of the occurrence of precipitation, fouling (depositing of solids on the surface of the permeation).

Osmotic Pressure—if two solutions of one same solute and same solvent, the first being very diluted and the second being concentrated, were placed in two compartments separated by a membrane permeable by a solvent, creates a solvent flow, through the membrane, in the direction of the first to the second, in the attempt to obtain, on the surface of the membrane, an equilibrium of concentrations; the pressure required to impede this flow is the osmotic pressure of the system, this is, characteristic of the solute, solvent, and membrane set.

Volumetric Reduction—defined as the fraction of the feed outflow that does not permeate the membrane, or rather, the concentrate, containing the contaminants rejected by it as a consequence. Normally identified in the text by % VR. Another manner of expressing this data is the recovery, this being the volumetric fraction of the permeate. As the separation processes using membranes are effective and efficient processes, that present, as a greater advantage, lower energy consumption, the volumetric reduction parameter is very important, as, however larger the % VR is, the lower the energy consumption shall be and the larger the advantages will be in the using of the process in question, in comparison with other separation processes, mainly those that use the phase change. In the case of the studied process, the intended use is the substitution of the warm acid hydrolysis process, that presents as one of the items, the larger steam consumption cost for the heating of the hydrolysis tubs; that said, however larger is the volumetric reduction, the lower shall be the consumption of steam to evaporate the concentrate, the treatment that is seen as the most viable in order o carry out this stage, consequently resulting in larger advantages with regards to the current process. It was economically verified that the volumetric reduction needs to be higher than 90% for the nano-filtration process to be better in energy terms, expressed by the steam consumption than that required in the current acid hydrolysis process, being that the volumetric reduction of 95% is the higher technical-economic advantages presented, having been fixed as an objective of the trials, that shall be described as examples.

Flow Test—executed before the beginning of the tests with the solution in study, a blank was performed, for which a sulfate solution of the magnesium standard is used, verifying its rejection by the membrane, for a standard outflow and pressure, supplied by the manufacturing catalogue for the membrane; this verification is done using the conductivity average for the solution. This test is executed be it at the beginning, as also after the trial, after the cleaning of the membranes, in order to verify the integrity of the membrane.

Pilot Unit—on which the trials are executed that shall be described as examples; constituted of by a feed set, provided for a feeding tank, low pressure feed pump, cartridge filter for the protection of the membranes, process pump for positive displacement, with nominal discharge pressure of 70 bar and nominal capacity of 16 gpm (American gallons per minute), two membrane modules, parallel provisions, feed and discharge tubes, two condensation collection tanks, valves for the appropriate handling of the unit, measurements of the outflow of the main currents, sensors and pressure and temperature alarms, centralized in an electrical command center. All sets, with the exception of the feeding tanks and the condensation collection are mounted on a single structure.

In TABLE 1 attached hereto, compares between the main parameters of each one of the examples from 1 through 16 to follow:

Example 1

Trial executed in a laboratory in the Pilot Unit, from the two distinct samples of the solution of effluent Acetic Acid of 300 liters. The objective of this trial was to test the volume that is considered representative, as well as to select the membrane with the best performance for the proposed process. For this proposal, two Modules were available, containing Elements of membranes that are different from the Pilot Unit, from the suppliers Desal and Filmtec, being that the first element had a permeation area of 9.01 m² and the second, a permeation area of 6.69 m². It is important to stress that these two suppliers were selected after consulting five different suppliers, aiming mainly at questioning the compatibility of the polymeric material that makes up the membranes to the effluent Acetic Acid.

A Flow Test was executed in order to verify the integrity of the membranes.

Initially, an integrity test was done on the sample, in order to confirm if the main contaminant, the inferior cellulose acetates were on the same level as the time when the sample was taken from the productive unit of the Applicant, which was confirmed through the determination of the Hydrolysis Degree. A complete characterization of the samples was also carried out, comparing it with that executed with the Applicant, concluding the total integrity of the sample.

The tests also aimed at verifying if the filtration executed in the previous stage to that studied, through the Scheibler filters is effective, concluding positively, as the degree of suspended solids is only 2 ppm.

The following are the parameters of the operation studied, Pressure, Temperature, and Feed Flow to the Module, varying them within the compatible limits to those components of the Pilot Unit, observing the Permeated Flow and the quality of the permeate, expressed through the determination of the Hydrolysis Degree. From the results of these studies, the most adequate operational condition was set to conduct the tests in the Pilot Unit.

In the operational condition that was considered to be the most adequate, this is 28 barg, 25° C. and 8 gpm (fed to each Module), the Volumetric Reduction test was executed, arriving at 83.3%, observing the parameters of Permeated Flow and its quality, expressed by the determination of the Hydrolysis Degree, concluding that the proposed process is effective, event with the elevated Volumetric Reduction. It is important to note that it was not possible to progress in the Volumetric Reduction due to the initial volume of the sample and the hydraulic limitation of the feed pump of the Pilot Unit, that operated in the Batch mode, when the feeding tank level is low, it results in the cavitation of the feed pump. Even on this level, the Volumetric Reduction was possible to observe that there is no occurrence of Concentration by Polarization.

At the maximum level of the Volumetric Reduction, a stability test was performed, consisting of operating the Pilot Unit for seven hours, verifying and noting any variation, which did not occur, once again confirming that there is no indication of Concentration by Polarization.

The Permeated Flow in the Module containing the Element supplied by Filmtec, was approximately double that verified in the one supplied by Desal, opting for the continuity of the trials using the elements supplied by Filmtec.

Example 2

Starting with this trial, and all of the other examples described in this document, all were realized in the Productive Plant of the Applicant, where the Pilot Unit was installed, being that the feeding tank receives the current in question, i.e., the effluent Acetic Acid; the Permeate obtained in the trials is collected in two different tanks, also interconnected with the Productive Plant, where the Permeate is returned.

For the execution of the trial described in this example, the Pilot Unit was equipped with two Elements containing Filmtec Membranes, selected in the first trail.

A Flow Test was executed in order to verify the integrity of the membranes.

Initially, the laboratory study was repeated, related to the parameters of the operation, Pressure, Temperature, and Feed Flow to the Module, varying them within the limits compatible with the components of the Pilot Unit, observing the Hydrolysis Degree and quality of the permeate. The results of these studies confirmed the operational condition determined in the laboratory, as being the most adequate for conducting the tests in the Pilot Unit, this is 28 barg, 25° C., and 8 gpm (feed to each Module).

With the objective of avoiding the problem of hydraulic limitation, described in Example 1, the trial described in this example was executed in the Modified Batch mode, maintaining the volume in the feeding tank at 315 liters.

Up to 50% VR, the flow and the quality of the permeate remained constant with good levels; on this level of volumetric reduction, a stability test was carried out, rotating the unit for almost 19 hours, no significant variations being observed. The hydrolysis degree observed remained between 4 and 8 seconds during the entire period. Starting at 57.5%, the beginning of the decline of the flow of the permeate was observed initially small, reaching a new plateau. Up to 67% VR, the hydrolysis degree was at an acceptable level, 15 seconds. At approximately 72.4%, a rapid decline in the flow of the permeate was observed, when the hydrolysis degree also rose rapidly up to 70 seconds. At this time, it was decided to interrupt the test, aiming at avoiding any damage to the installation, be it the cartridge filter, be it the membrane. It is important to note that, for no significant increase of the Operation Pressure having been observed up to the time of the interruption of the trial, there was no blockage of the membrane, by what is described, be it in terms of the flow decline, as well as the hydrolysis degree, supposing that what occurred was due to Concentration by Polarization, which occurred due to the precipitation of the contaminant, which could be visually observed, by the formation of small white points that, by being soluble in acetone, may possibly be identified as cellulose acetate. This precipitation eventually occurred, be it due to the saturation of the solution, as a consequence of the concentration in course, pursuant to what is described for this trail mode, be it due to the excessive oscillation of the acetic acid concentration in the feed; the initial concentration of acetic acid was 25%, being that this was not maintained constant, arriving at the minimal level of 22% throughout the trial.

The easy cleaning of the membranes is more evidence that the phenomena that was observed was Concentration by Polarization, caused by the formation of gels on the membranes and not solids. The cleaning of the dense membranes is usually done with the use of surfactants, with low water consumption of cleaning. However, it is suitable to reaffirm that, in the case descried, the cleaning was considered easy as it required low consumption of surfactants and washing and rinsing water, as well as little time. The formation of gels on the membrane explains why the quality of the permeate, expressed by the Hydrolysis Degree, remains constant and low up to approximately 50% VR, when, due to the phenomena described previously of Concentration by Polarization, starts the precipitation of gels, affecting the Hydrolysis Degree of the permeate, that begins to oscillate and increase quickly, in spite of maintaining the constancy of the flow of the permeate, that only diminished abruptly at the end of the trial, when concomitantly the abrupt increase occurs in the Hydrolysis Degree, further distinguishing that, even at this time, there was no increase in the Operation Pressure, in spite of the pump used to have positive dislocation.

If it were the precipitation of solids, the tendency, by the type of pump used, would be to verify a rapid increase in the Operation Pressure, as if the increase of the Hydrolysis Degree in the Permeate were initiated, the phenomena would be followed by the blocking of the membrane, which, pursuant to what is mentioned previously, actually did not occur.

Example 3

With the objective of avoiding the problem of possible interference in the variation of the concentration of acetic acid in the solution of fed effluent Acetic Acid, as is verified in the description in Example 2, the trial described in this example was executed in a Batch mode, starting however from the initial volume of 400 liters in the feeding tank sufficient for avoiding the hydraulic limitation up to the Volumetric Reduction a little higher than 90%.

The concentration of acetic acid in the current effluent Acetic Acid was 30.4% in weight.

As customary, a Flow Test was performed.

The trial was executed in the conditions established as the most adequate, pursuant to what is described in Example 1, this is, 28 barg, 25° C. and 8 gpm (fed to each Module).

In this trial, the Volumetric Reduction arrived at 65%, with the flow and the quality of the permeate remaining constant, in spite of the latter, expressed by the Hydrolysis Degree, being at unsatisfactory levels, this is, higher than 20 seconds. In spite of this, the continuity of the trial was maintained, that close of 80% VR was interrupted by the abrupt and exaggerated increase of the Hydrolysis Degree, with concomitant exaggerated decrease of the flow of the permeate. In spite of it not being possible to visualize the precipitated, it was also evident that the described also is due to the precipitation of gels on the membrane due to the Concentration by Polarization.

Example 4

With the same objective described in Example 3, the trial described in this example was executed in a Batch mode, starting with an initial volume of 400 liters in the feeding tank.

The concentration of the acetic acid in the current of effluent Acetic Acid was 29.6% in weight.

As customary, a Flow Test was performed.

The trial was executed in the conditions established, pursuant to what is described in Example 1, this is, 28 barg, 25° C. and 8 gpm (fed to each Module).

This was the first trial in which the dynamic effect of the test system was observed this is, up to a certain time after the start of the trail, the quality of the permeate, expressed by the Hydrolysis Degree is elevated, diminishing over time, even maintaining the system in re-circulation, or rather, the Volumetric Reduction null, showing a balance between the contaminants and the surface of the membrane, that demands a certain period of time to be established. This balance being established, it was observed that the flow and quality of the permeate remain constant. From this observation, it was established for subsequent trials, an adequate period of time, determined by the obtainment of a constant Hydrolysis Degree, as a necessary condition for the establishment of the balance of the system.

In this trial, the Volumetric Reduction arrived at 65%, with the flow and quality of the permeate being constant, in spite of the latter, expressed by the Hydrolysis Degree being at unsatisfactory levels, this is, higher than 20 seconds. In spite of this, the continuity of the trial remained, that close to 90% VR was interrupted by the abrupt and exaggerated increase of the Hydrolysis Degree, with concomitant exaggerated decrease of the flow of the permeate. Once more, in spite of it not being possible to visualize the precipitated, it was also evident that the described also is due to the precipitation of gels on the membrane due to the Concentration by Polarization.

Example 5

As with all of the examples described, with the exception of Example 1, the occurrence of precipitation between 60 and 70% VR was verified, characterized by the increase of the Hydrolysis Degree and the concomitant diminishing of the flow of the permeate, be it operating in a Batch or Modified Batch mode, it was decided to verify the influence of the concentration of acetic acid in the current effluent Acetic Acid.

With this objective, the trial described in this example was executed in a Batch mode, starting with an initial volume of 400 liters in the feeding tank, increasing the concentration of the acetic acid in the current of the effluent Acetic Acid from 28.5% in weight, that was being obtained from the Manufacturing, to 36.9% in weight, using distilled acetic acid.

As customary, a Flow Test was performed.

The trial was executed in the conditions established, pursuant to what is described in Example 1, this is, 28 barg, 25° C. and 8 gpm (fed to each Module).

Pursuant to what is described in Example 4, the establishment of balance was awaited in order to start the Volumetric Reduction. In this trial, a Volumetric Reduction 80% was reached, with flow and quality of the permeate remaining constant and at good levels, being that the quality, expressed by the Hydrolysis Degree was maintained at 11 seconds. Starting at 80% VR, the concomitant decrease in the permeation flow and the increase of Hydrolysis Degree were observed, without however, the usual abrupt increase being verified, until at 90% VR it was interrupted, aiming at avoiding possible damage to the installation. Once more, in spite of it not being possible to visualize the precipitate, it was also evident that the described also is due to the precipitation of gels on the membrane due to the Concentration by Polarization. An important observation is related to the fact that, some minutes after the adjournment of the trial, with quick cooling of the residual concentrate, an intense precipitation was observed, which was attributed to the fact that a small volume of the feeding tank of the Pilot Unit was falsifying the result, this is, the solution would be saturated at lower levels of Volumetric Reduction, but, the dynamic of the unit permitted that the trial progressed, even with the solution being super-saturated.

Example 6

With the objective of reaching, using a batch test, the maximum volumetric reduction, without hydraulic restrictions, as well as to verify what is observed in Example 5, with regards to the influence of the small dimensions of the feeding tank of the Pilot Unit on the dynamic of the precipitation, a trial using a larger feeding tank was organized, available in the manufacturing used, with a nominal volume of 6 m³, provided for the electronic level monitoring, from 4970 liters of the effluent Acetic Acid current, initially in the concentration of acetic acid of 28.5% weight, increased to 29.5%, with distilled acetic acid.

As customary, a Flow Test was performed. The trial was executed in the conditions established as the most adequate, pursuant to what is described in Example 1, this is, 28 barg, 25° C. and 8 gpm (fed to each Module).

Pursuant to what is described in Example 4, the establishment of balance to start the Volumetric Reduction was awaited.

In this trial, the Volumetric Reduction arrived at 70%, with flow and quality of the permeate being constant and at good levels, being that the quality, expressed by the Hydrolysis Degree was maintained in values lower than 10 seconds. Starting at 70% VR, the usual and concomitant decrease in the permeation flow and the increase of the Hydrolysis Degree, being that, with this done, due to the large volume handled in the feeding tank, the precipitation as very intense and fast, the Differential of Pressure on the Cartridge Filter abruptly increased, until, at 73% VR, the trial was interrupted, using the key of low pressure of the pump feed of positive dislocation. However, in a manner different from that observed in all of the trials, there was no accentuated increase in the Hydrolysis Degree, which at this final instant reached 27 seconds, the fact that the low velocity of the tank being interpreted as meaning that it permitted that the precipitated came to reach a dimension that, taken in the cartridge filter, resulted in the elevation observed in the Differential Pressure on the Cartridge Filter, interrupting the trial.

Once more, in spite of it not being possible to visualize the precipitated, it was also evident that the described also is due to the precipitation of gels on the membrane due to the Concentration by Polarization. It was also evident that, in spite of the end of the trial being abrupt, pursuant to what is described above, there was no blockage of the membranes, nor with the cartridge filter, but yes with an acceleration of the precipitation, favored by the large dimensions of the tank used, which resulted in low speeds, that showed to be more distant, in terms of the industrial installation of which the dimension of the feeding tank of the Pilot Unit, in terms of the time of residence of the current in question in the installation.

Example 7

After the execution of the trials described in the previous examples, the explanation contained in the introduction began to be clearer, this is, for the obtainment of cellulose acetate in a quality that is compatible with the spinning process, one has to count on the presence of inferior cellulose acetates and hemicelluloses, that with the concentration originating from the process in question, precipitate. Thus, a new philosophy was adopted for planing the trials, directed up through the trial described in the last example, in the attempt to avoid precipitation, which is impossible, adopting a new philosophy, directed at trying to minimize the effects of precipitation on the process. In order to better visualize the precipitation, starting with this trial, a new parameter was introduced to accompany the trial, which is the Differential Pressure on the Cartridge Filter.

The first attempted parameter was the temperature, supposing that the solubility increases with the temperature. With this objective, the trial described in this example was executed in the Batch mode, starting with the initial volume of 400 liters in the feeding tank, at a 26% concentration of the effluent Acetic Acid current, maintaining a temperature of 30° C. and the other conditions pursuant to what is established in Example 1, this is 28 barg and 8 gpm.

As customary, a Flow Test was performed.

Pursuant to what is described in Example 4, the establishment of balance in order to start the Volumetric Reduction was awaited.

In this trial, the Volumetric Reduction arrived at 75%, with flow and Differential Pressure on the Cartridge Filter remaining constant and at acceptable levels, however, since the beginning of the trial, the quality of the permeate, expressed by the Hydrolysis Degree, did not stabilize, showing that the increase in the temperature diminished the selectivity of the membrane permeation. Starting at 75% VR, the slow decrease of the permeation flow was concomitantly verified, the abrupt increase of the Differential Pressure on the Cartridge Filter and the erratic behavior of the Hydrolysis Degree up to 89% VR, when the trial was interrupted, aiming at avoiding possible damages to the installation. Once more, in spite of the fact that it not being possible to visualize the precipitated, it was also evident that the described is also due to the precipitation of gels on the cartridge filter, being that the increase of the temperature did not show as an effective means for reducing the effects of the precipitation, as also was presented as a negative effect for diminishing the selectivity of the membrane.

Example 8

Following the description in Example 7, another parameter attempted was the outflow, supposing that the effect of the precipitation may be minimized by the increase of the turbulence (solubility increases with temperature). With this objective, the trial described in this example was executed in a Batch mode, starting with the initial volume of 400 liters in the feeding tank, in the concentration of 27% of the effluent Acetic Acid current, increasing the feed outflow to Module, starting from this sole trial, of 16 gpm, and the other conditions pursuant to what is established in Example 1, this is, 28 barg, and 25° C.

As customary, a Flow Test was performed.

Pursuant the description in Example 4, the establishment of balance in order to start the Volumetric Reduction was awaited.

In this trial, the Volumetric Reduction arrived at 85%, with flow, Differential Pressure on the Cartridge Filter, and the quality of the permeate, expressed by the Hydrolysis Degree remaining constant and at very good levels. Starting at 85% VR, the smooth decrease of the permeation flow and the increase of the Hydrolysis Degree were concomitantly verified, being that the latter until the end remained below 10 seconds. The verification of the precipitation was explained by the abrupt increase of the Differential Pressure on the Cartridge Filter, which resulted in the interruption of the trial at 92% VR. This done, it was also not possible to visualize the precipitated, but, as in various other examples described previously, the precipitation of the gels on the cartridge filter was mainly characterized by the fact that had not been observed any significant increase of the Operation Pressure, concluding that the significant outflow increase did not demonstrate to be an effective means for reducing the precipitation effects, in spite of being a very good means for improving the membrane selectivity.

Example 9

Following the description in Example 7, another idea tested was the use of an additive, as a means of modifying the equilibrium of the system, aiming at maintaining the concentrated solution stable, minimizing in consequence the precipitation effects.

This idea comes from the observation that, in all of the described examples, the precipitation observed resulted in gel deposits on the membrane that were easy to remove, suggesting that the surfactants used for the cleaning had the property to resuspend the contaminants, in order to remove them from the membrane surface. Initially, some exploratory tests were performed in the laboratory, in the attempt to determine which surfactant would be most adequate for the problem; the first additive tested was the surfactant used in the cleaning of the membranes, after the execution of various trials previously described, this product contains approximately 30% of its compensation as being sodium dodecyl benzene sulfonate, being that the rest of the composition is made up of various salts, used to give volume, scent, etc. It was verified that this surfactant had the capacity to re-suspend the precipitates for an appreciable period to time, as the precipitation occurred again some hours later. Therefore, for the intended proposal, the product tested would work. In order to avoid burdening the solution with other salts contained in the cited surfactant, another exploratory laboratory test was executed, using the pure dodecyl benzene sulfonic acid, obtaining a result similar to what is described, with the advantage that, as a new precipitation is observed, after some time, a small adherence of the precipitated was verified on the wall, concluding that this effect, transposed to the intended application would be extremely positive. Thus, a trial was decide on, using this additive, in the Pilot Unit.

With this objective, the trial described in this example was executed in a Batch mode, starting with the initial volume of 400 liters in the feeding tank, in the concentration of 27% of the effluent Acetic Acid current, adding 60 grams of dodecyl benzene sulfonic acid, equivalent to 150 ppm, considered the initial volume, but at the time when the Volumetric Reduction was 50%. The temperature and pressure conditions were maintained pursuant to what is established in Example 1, this is, 28 barg, and 25° C., being that the feed outflow to the sole Module was maintained at 16 gpm, pursuant the description in Example 8.

As customary, a Flow Test was performed.

Pursuant the description in Example 4, the establishment of balance in order to start the Volumetric Reduction was awaited. In this trial, the Volumetric Reduction arrived at 94%, with the flow and Differential Pressure on the Cartridge Filter remaining constant, characterizing the stability of the concentrated solution. However, the quality of the permeate, expressed by the Hydrolysis Degree was not satisfactory from the start, being that, after the addition of the additive, the Hydrolysis Degree was always above 3 minutes, showing that the additive would be permeating through the membrane, which is an undesirable fact. This done, it was also possible to visualize the precipitated, but with the advantage that no precipitation even some time after the trial having been finalized was observed which characterizes, in an even more notable manner, the stability of the solution of the concentrate, which is a positive notable fact of these examples, which is better through the observation of not having any significant increase of Operation Pressure being observed, concluding that the use of the dodecyl benzene sulfonic acid was positive in the attempt to minimize the effects of precipitation. The permeation of the dodecyl benzene sulfonic acid, compromising the quality of the permeate observed in this trial, was attributed to the relatively low molecular weight of this additive, which would permit its passage, assuming that the selectivity of the membrane depended on the dimension of the product, or, explaining the selectivity in the membrane by the different chemical nature of the product, the additive tested would not be sufficiently aromatic, in order to be rejected by the membrane, of aliphatic nature.

Example 10

Following the idea described in Example 9, or rather, in order to make the concentrate of the nano-filtration process adequate, in terms of stability, this is, avoiding the precipitation of the contaminates, as well as to try to avoid the permeation of the additive through the membrane, it was supposed that the use of the magnesium dodecyl benzene sulfonate would be more adequate, be it by the significant increase of the molecular weight of the additive, as well as by the increase of the benzene ring numbers, in addition to the use of magnesium, used in the standard measurement test for the Filmtec membrane efficiency, as the cation rejected by it, pursuant to what is described in the Flow Test.

Aiming at verifying what is established above, the trial described in this example was executed in the Batch mode, starting with the initial volume of 400 liters in the feeding tank, in the concentration of 27% of the effluent Acetic Acid current, adding 6 grams of magnesium dodecyl benzene sulfonate acid, equivalent to 15 ppm, at the initial moment of the trial. The temperature and pressure conditions were maintained pursuant to what is established in Example 1, this is, 28 barg, and 25° C., being that the feed outflow to the sole Module was maintained at 16 gpm, pursuant to the description in Example 8.

As customary, a Flow Test was performed.

Pursuant the description in Example 4, the establishment of balance in order to start the Volumetric Reduction was awaited.

In this trial, the Volumetric Reduction arrived at 85%, with the flow and Differential Pressure on the Cartridge Filter remaining constant, characterizing the stability increase of the concentrated solution, using as a base those examples when there was no addition of any additive. However, the quality of the permeate, expressed by the Hydrolysis Degree, was not satisfactory since the Volumetric Reduction was 50%, starting when the time for the foam deterioration was always higher than 20 seconds and increasing slowly yet continually, showing once more that the additive would be permeating through the membrane. Starting at 85% VR, the usual abrupt increase of the Differential Pressure on the Cartridge Filter was verified, with the concomitant reduction tht is also abrupt of the permeate flow, being however, important to observe that the change of these parameters was not notable, as was observed, without the use of additives. The trail was interrupted at 90% VR, without observing, even at the end, a significant increase of the Hydrolysis Degree, as usually occurs, without the additive. Once more, it was also not possible to visualize the precipitated, even after the ending of the trial, as observed in the previous example, which constitutes an advantage, characterizing the stability of the concentrated solution, also improved by the observation of not having observed any significant increase in the Operation Pressure, also concluding that the use of the magnesium dodecyl benzene sulfonate was positive in an attempt to minimize the effects of the precipitation, but was not sufficient for avoiding it, which was not verified in the previous example. Once more, the permeation of the magnesium dodecyl benzene sulfonate was interpreted in a manner identical to that interpreted in the previous example.

This example was repeated in various trials, varying the concentration of this additive, as well as using a combination of the dodecyl benzene sulfonic acid and magnesium acetate, even testing only the magnesium acetate, but always, with small variations in terms of the quality of the permeate, without success, with regards to the verification of the precipitation.

Example 11

Always following the idea described in Example 9, or rather, to make the nano-filtration process of the concentrate adequate, in terms of stability, this is, avoiding the precipitation of the contaminants, as well as to try to avoid the permeation of the additive through the membrane, but aiming at avoiding what is verified with the use of the additives described in the previous examples, or rather, its permeation through the membrane, which is prejudicial to the quality of the permeate, various suppliers of additives were consulted, with the objective of guaranteeing for us the development of an additive with a significant molecular weight that would impede its permeation through the membrane, assuming that the selectivity depended on the dimension of the product, or, explaining the selectivity in the membrane by a different chemical nature for the product, that the additive to be developed would have to be excessively aromatic, in order to be rejected by the membrane, of an aliphatic nature. Meeting this specification, trials with four different additives were executed, to wit: sodium diisopropylnaphthalene sulfonate, sodium polymethylnaphthyl methylene sulfonate, polyarylphenol ethoxylate, and triesterilphenol ethoxylate, in exploratory laboratory tests, executed pursuant to what is described in Example 9, did not prove to be adequate for the proposed application, so it was decided to not carry out tests on the Pilot Unit using them. Thus it was opted to experiment with the Goodrich AF820 additive, with which exploratory tests were also executed, always in accordance with what is described in Example 9, with satisfactory results, deciding to use it in the Pilot Unit.

The trial described in this example was executed in the Batch mode, starting with the initial volume of 400 liters in the feeding tank, in the concentration of 29% of the effluent Acetic Acid current, adding 4 grams of AF820 additive, equivalent to 10 ppm, at the initial moment of the trial. The temperature and pressure conditions were maintained pursuant to what is established in Example 1, this is, 28 barg, and 25° C., being that the feed outflow to the sole Module was maintained at 16 gpm, pursuant the description in Example 8.

As customary, a Flow Test was performed.

Pursuant the description in Example 4, the establishment of balance in order to start the Volumetric Reduction was awaited.

In this trial, the Volumetric Reduction arrived at 85%, with the flow and Differential of the Pressure on the Cartridge Filter and permeate quality, expressed by Hydrolysis Degree, remaining constant. Starting at 85% VR, the usual increase of the Differential of the Pressure on the Cartridge Filter was verified, with the concomitant reduction that is also of the permeated flow, being however, important to observe that the change of these parameters was not abrupt, as was observed, without the use of additives. Even at this time, as up to the interruption of the trial, which occurred at 89% VR, the quality of the permeate, expressed by the Hydrolysis Degree, remained constant with the time for the deterioration of the foam, of less than 10 seconds, which characterized that there was no detectable passage of additive or contaminant through the membrane. Once more, it was also not possible to visualize the rpecipitated, even after the ending of the trial, as observed in the previous example, which constitutes an advantage, characterizing the stability of the concentrated solution, also improved by the observation of not having observed any significant increase in the Operation Pressure, also concluding that the use of the AF820 was positive in the attempt to minimize the effects of the precipitation, but was not sufficient for avoiding it. The verified precipitation was interpreted due to the low concentration of an additive.

Example 12

Using what is described in Example 11 as a base, it was decided to increase the additive concentration, with the objective of trying to avoid the precipitation in the concentrate.

The trial described in this example was executed in the Batch mode, starting with the initial volume of 400 liters in the feeding tank, in the concentration of 24% of the effluent Acetic Acid current, adding 40 grams of AF820 additive, equivalent to 100 ppm, at the initial moment of the trial. The temperature and pressure conditions were maintained pursuant to what is established in Example 1, this is, 28 barg, and 25° C., being that the feed outflow to the sole Module was maintained at 16 gpm, pursuant the description in Example 8.

As customary, a Flow Test was performed.

Pursuant the description in Example 4, the establishment of balance in order to start the Volumetric Reduction was awaited.

In this trial, the Volumetric Reduction arrived at 85%, with the flow and Differential of the Pressure Cartridge Filter and permeate quality, expressed by Hydrolysis Degree, remaining constant. Starting at 85% VR, the usual increase of the Differential of the Pressure on the Cartridge Filter was verified, with the concomitant reduction of the permeated flow, being however, important to observe that the change of these parameters was even slower than that observed in Example 11. Even at this time, as up to the interruption of the trial which occurred at 90% VR, the quality of the permeate, expressed by the Hydrolysis Degree, remained constant with the time for the deterioration of the foam of less than 10 seconds, which newly characterized that there was no detectable passage of additive or contaminant through the membrane. Once more, it was also not possible to visualize the precipitated, even after the ending of the trial, as observed in the previous example, which constitutes an advantage, characterizing the stability of the concentrated solution, also improved by the observation of not having observed any significant increase in the Operation Pressure, also concluding that the use of a higher concentration of AF820 was even more positive in the attempt to minimize the effects of the precipitation, but was not sufficient for avoiding it.

Example 13

The additive used in the trials described in Examples 11 and 12 guaranteed the formation of a complex that effectively did not permeate through the membrane, guaranteeing a stability of the concentrate greater than that when using other additives, although not being sufficient for avoiding precipitation at elevated Volumetric Reduction levels. An exploratory test in a laboratory with the sodium lignosulfonate, product of a highly aromatic character and with a considerably elevated molecular weight, showed that the restricted stability of the concentrated solution may be obtained with its use.

The trial described in this example was executed in the Batch mode, starting with the initial volume of 400 liters in the feeding tank, in the concentration of 26% of the effluent Acetic Acid current, adding 120 grams of sodium lignosulfonate, equivalent to 300 ppm, at the initial moment of the trial. The temperature and pressure conditions were maintained pursuant to what is established in Example 1, this is, 28 barg, and 25° C., being that the feed outflow to the sole Module was maintained at 16 gpm, pursuant the description in Example 8.

As customary, a Flow Test was performed.

Pursuant the description in Example 4, the establishment of balance in order to start the Volumetric Reduction was awaited.

In this trial, the Volumetric Reduction arrived at 85%, with the flow and Differential of the Pressure on the Cartridge Filter and permeate quality, expressed by Hydrolysis Degree, remaining constant. Starting at 85% VR, the usual increase of the Differential of the Pressure on the Cartridge Filter was verified, with the concomitant reduction as well of the permeated flow as well, it however being important to observe that the change of these parameters was even slower than that verified in Examples 11 and 12. Even at this time, as up to the interruption of the trial which occurred at 92% VR, the quality of the permeate, expressed by the Hydrolysis Degree, remained constant with the time for the deterioration of the foam of less than 10 seconds, which characterized that there was no detectable passage of additive or contaminant through the membrane. Once more, it was also not possible to visualize any precipitate, mainly because the concentrated solution remained extremely clear, despite very dark, even after the ending of the trial, which constitutes an advantage, characterizing the stability of the concentrated solution, also improved by the observation of not having observed any significant increase in the Operation Pressure, also concluding that the use of the sodium lignosulfonate was positive in the attempt to minimize the effects of the precipitation, but was not sufficient for avoiding it. The verified precipitation was interpreted due to the low concentration of the additive.

Example 14

Aiming at increasing the stability of the concentrated solution from what was observed in the trial described in Example 13, it was decided to increase the concentration of the sodium lignosulfonate.

The trial described in this example was executed in the Batch mode, starting with the initial volume of 400 liters in the feeding tank, in the concentration of 27% of the effluent Acetic Acid current, adding 505 grams of sodium lignosulfonate, equivalent to 1262.5 ppm, at the initial moment of the trial. The temperature and pressure conditions were maintained pursuant to what is established in Example 1, this is, 28 barg, and 25° C., being that the feed outflow to the sole Module was maintained at 16 gpm, pursuant the description in Example 8.

As customary, a Flow Test was performed.

Pursuant the description in Example 4, the establishment of balance in order to start the Volumetric Reduction was awaited.

In this trial, the Volumetric reduction arrived at 80%, with the flow, Differential of the Pressure on the Cartridge Filter, and permeate quality, expressed by Hydrolysis Degree, remaining constant. Starting at 80% VR, the increase of the Differential of the Pressure on the Cartridge Filter was verified, with the concomitant reduction of the permeated flow, but it was even slower than what was verified in the previous examples. Even at this time, as up to the interruption of the trial which occurred at 92% VR, the quality of the permeate, expressed by Hydrolysis Degree, remained constant with the time for the deterioration of the foam of less than 9 seconds, which characterized that there was no detectable passage of additive or contaminant through the membrane. Once more, it was also not possible to visualize the precipitated, mainly because the concentrated solution remained extremely clear, despite very dark, even after the ending of the trial, which constitutes an advantage, characterizing the stability of the concetrated solution, also improved by the observation of not having observed any significant increase in the Operation Pressure, also concluding that the use of the sodium lignosulfonate was positive, it being possible to say that the precipitation was practically avoided, as the interruption of the trial was due to the hydraulic limitation of the Pilot Unit, operating in the Batch mode. In order to have an idea of the stability of the concentrate obtained, there are samples collected after more than 60 days, that do not present any indication of precipitation. Another test performed on the final concentration is the dilution with water, diminishing the concentration of the acetic acid solution, which would result in the immediate precipitation of the contaminants, due to the knowledge of the solubility curve for the inferior cellulose acetates and hemicelluloses in an aqueous solution of acetic acid, the presence of sodium lignosulfonate delayed this precipitation, that only occurred after the addition of a volume of water that is identical to the volume of the sample, proving the stability of the concentrated solution, obtained pursuant to the description in this sample.

Example 15

Aiming at increasing the stability of the concentrated solution from what was observed in the trial described in Example 14, it was decided to increase the concentration of the sodium lignosulfonate, as well as to avoid any hydraulic limitations of the Pilot Unit, to realize the test in a Modified Batch mode, maintaining the constant volume of 315 liters in the feeding tank, in the concentration of 26% of the effluent Acetic Acid current, adding 6.4 grams of sodium lignosulfonate into the concentration per liter fed, at the initial moment of the trial. The temperature and pressure conditions were maintained pursuant to what is established in Example 1, this is, 28 barg, and 25° C., being that the feed outflow to the sole Module was maintained at 16 gpm, pursuant the description in Example 8.

As customary, a Flow Test was performed.

Pursuant the description in Example 4, the establishment of balance in order to start the Volumetric Reduction was awaited.

In this trial, the Volumetric Reduction arived at 75% VR, with the flow, Differential of the Pressure on the Cartridge Filter, and permeate quality, expressed by Hydrolysis Degree, remaining constant. Starting at 75%, the gradual diminishing of the permeated flow was verified, without however, observing the usually verified increase of the Differential of the Pressure on the Cartridge Filter which remained constant until the end of the trial which occurred at 89% VR, confirming the stability of the concentrated. Until the interruption of the trial, the quality of the permeate, expressed by the Hydrolysis Degree, remained constant and with a foam deterioration time of less than 9 seconds, which charaterized that there was no detectable passage of additive or contaminant through the membrane. The observations related to the stability of the concentrate, made in the trials desribed in Example 14 are also valid for the trial described in this example, confirming the extreme stability of the concentrate, which constitutes an extremely positive fact. The verified reduction was attributed to the permeated flow, which caused the interruption of the trial, by the fact that the Osmotic Pressure of the system being reached.

Example 16

The trial described in Example 15 demonstrated that the elevated concentration of sodium lignosulfonate guaranteed the stability of the concentrated solution, but resulted in reaching the osmotic pressure of the system, which caused the interruption of the trial. The trial described in this Example was planned based on the positive results of the trial described in Example 14, including the use of the same concentration of the additive, with the idea of adding an extra quantity, at the time that there was any indication of precipitation, mainly evidenced by the Differential of the Pressure on the Cartridge Filter.

The trial described in this example was executed in the Batch mode, starting with the initial volume of 400 liters in the feeding tank, in the concentration of 25.5% of the effluent Acetic Acid current, adding 505 grams of sodium lignosulfonate, equivalent to 1262.5 ppm, at the initial moment of the trial. The temperature and pressure conditions were maintained pursuant to what is established in Example 1, this is, 28 barg, and 25° C., being that the feed outflow to the sole Module was maintained at 16 gpm, pursuant the description in Example 8.

As customary, a Flow Test was performed.

Pursuant the description in Example 4, the establishment of balance in order to start the Volumetric Reduction was awaited.

In this trial, the Volumetric Reduction arrived at 85%, with the flow, Differential of the Pressure on the Cartridge Filter, and permeate quality, expressed by Hydrolysis Degree, remaining constant. Starting at 85% VR, the gradual permeated flow was verified as diminishing, as well as the increase of the Differential of the Pressure on the Cartridge Filter, noting however that both changes of the parameters occurred in a very slow and controlled manner. At 89.6% VR, as the above objective described, this is, to diminish the tendency towards precipitation, extending the trial, another 67 grams of sodium lignosulfonate were added, which was repeated at 90.9% VR, when 34 additional grams of sodium lignosulfonate were added. These extra additions permitted the variations of the critical periods in this period, or rather, the flow of the permeate and Differential of the Pressure on the Cartridge Filter occurred in the slowest and most controlled manner possible, which permitted that the trial could continue until 94% VR was reached, confirming the stability of the concentrate. Until the interruption of the trial, the quality of the permeate, expressed by the Hydrolysis Degree, remained constant and with a foam deterioration time of under 9 seconds, which characterized that there was no detectable passage of additive or contaminant, through the membrane. The observations related to the stability of the concentrate, made by the trials described in Examples 14 and 15, are also valid for the trial decribed in this example, confirming the extreme stability of the concentrate, which constitutes an extremely positive fact.

Example 17

In a laboratory, the concentrate obtained in the previous example was concentrated in a primary evaporation effect until the volume was approximately 5% of the initial volume, distilling the aqueous solution of acetic acid at reduced pressure; the residual contained from this concentrate was evaporated in a second effect, also at reduced pressure, until a solid residue is secured, which may be incinerated or recycled. As it was possible to carry out this conditioning of the concentrate, aiming at its final disposal, with practically no loss of acetic acid, it was concluded that the process studied is technically viable.

TABLE 1

| Example | Acetic Acid Concentrated Solution (%) | Volume (l) | Operational Conditions | Hydrolysis Degree | Volumetric Reduction (%) | Surfactant/ Quantity | Process Type | Observations | Final Concentration |
|---|---|---|---|---|---|---|---|---|---|
| 1 | 30 | 300 | 28 barg 25° C. 8 gpm (to each module) | | 83.3 | | Batch | | |
| 2 | 25 to 22 | 315 | 28 barg 25° C. 8 gpm (to each module) | −4 to 8 15 70 | | | Modified Batch | Gel precipitation on the membrane | 50 67 72.4 |
| 3 | 30.4 | 400 | 28 barg 25° C. 8 gpm (to each module) | >20 | 65 | | Batch | Gel precipitation on the membrane | 80% VR |
| 4 | 29.6 | 400 | 28 barg 25° C. 8 gpm (to each module) | >20 | 65 | | Batch | There was precipitation | 90% VR |
| 5 | 36.9 | 400 | 28 barg 25° C. 8 gpm (to each module) | 11 | 80 | | Batch | Gel Precipitation | 90% VR |
| 6 | 29.5 | 4970 | 28 barg 25° C. 8 gpm (to each module) | <10 | 27 | | | Gel Precipitation | 73% VR |

TABLE 1-continued

| Example | Acetic Acid Concentrated Solution (%) | Volume (l) | Operational Conditions | Hydrolysis Degree | Volumetric Reduction (%) | Surfactant/ Quantity | Process Type | Observations | Final Concentration |
|---|---|---|---|---|---|---|---|---|---|
| 7 | 26 | 400 | 28 barg 30° C. 8 gpm (to each module) | Satisfactory | 75 | | Batch | Gel formation | 89% VR |
| 8 | 27 | 400 | 28 barg 25° C. 16 gpm (to each module) | 10 | 85 | | Batch | Gel formation | 92% VR |
| 9 | 27 | 400 | 28 barg 25° C. 16 gpm (to each module) | >3 | 94 | pure dodecyl benzene sulfonic acid 60 g (corresp. 150 ppm initial volume - red volumet 50% VR) | Batch | Additive permeated. Did not precipitate. | |
| 10 | 27 | 400 | 28 barg 25° C. 16 gpm (to each module) | >20 | 85 | Dodecyl benzene sulfonate Mg 6 g (equal to 15 ppm at initial moment) and/or Mg acetate | Batch | Additive permeated. No precipitation. | 90% VR w/o increase of Hydrolysis degree |
| 11 | 29 | 400 | 28 barg 25° C. 16 gpm (to each module) | <10 | 85 | AF 820 4 g (equal to 10 ppm at the initial moment) | Batch | No permeation. Precipitation occurred due to the low additive conc | 89% VR |
| 12 | 24 | 400 | 28 barg 25° C. 16 gpm (to each module) | <10 | 85 | AF 820 40 g (equal to 100 ppm from the initial moment) | Batch | No permeation Precipitation | 90% VR |
| 13 | 26 | 400 | 28 barg 25° C. 16 gpm (to each module) | <10 | 85 | Na ligno-sulfonate 120 g (equal to 300 ppm in the initial process) | Batch | Precipitated due to the low surfactant concentration | 92% VR |
| 14 | 27 | 400 | 28 barg 25° C. 16 gpm (to each module) | <9 | 80 | Na ligno-sulfonate 505 g (equal to 1262.5 ppm in the initial process) | Batch | Precipitation practically avoided | 92% VR |
| 15 | 26 | 315 | 28 barg 25° C. 16 gpm (to each module) | <9 | 75 | Na ligno-sulfonate 6.5 g/liter (in in initial process) | Modified Batch | Stability of the concentrate Reached osmotic pressure | 89% VR |
| 16 | 25.5 | 400 | 28 barg 25° C. 16 gpm (to each module) | <9 | 85 | Na ligno-sulfonate 505 g (equal to 1262.5 ppm in the initial process) | Batch | Stability of the concentrate | 94% VR |

What is claimed is:

1. The use of surface-active agents in the process of removing impurities from solutions containing acetic derivatives using nano-filtration membranes, in the process of obtaining cellulose acetate, wherein said process starting with aqueous solutions containing between 20 and 35% weight of acetic derivatives having been optionally decanted and filtered in a conventional manner in order to remove suspended impurities, which undergo the addition of one or more surface-active agents while submitted to a tangential filtration process via polymer membranes, the cutting range of which may vary between approximately 0.001 and 0.005 microns, and feed pressure which may vary between approximately 1 and 50 barg, at least one of the surface-active agents presents a component chosen from among the lignosulfonates.

2. The use of surface-active agents in the process of removing impurities from solutions containing acetic derivatives using nano-filtration with membranes, in the process of obtaining cellulose acetate according to claim 1 characterized in that the lignosulfonates employed contain, preferentially in its structure, the monomeric structure

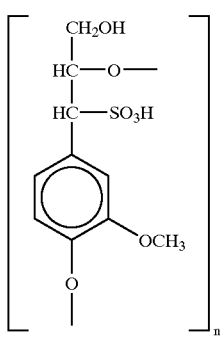

3. The use of surface-active agents in the process of removing impurities from solutions containing acetic derivatives using nano-filtration with membranes, in the process of obtaining cellulose acetate according to claim 1 characterized in that the feed pressure employed being preferentially chosen from between 5 and 25 barg.

4. The use of surface-active agents in the process of removing impurities from solutions containing acetic derivatives using nano-filtration with membranes, in the process of obtaining cellulose acetate according to claim 1 characterized in that the acetic derivative preferentially may be acetic acid or a derivative thereof.

5. The use of surface-active agents in the process of removing impurities from solutions containing acetic derivatives using nano-filtration with membranes, in the process of obtaining cellulose acetate according to claim 1 characterized in that surface-active agents may be presented in a mono or bivalent lignosulfonate form.

6. The use of surface-active agents in the process of removing impurities from solutions containing acetic derivatives using nano-filtration with membranes, in the process of obtaining cellulose acetate according to claim 2 characterized in that surface-active agents may be presented in a mono or bivalent lignosulfonate form.

* * * * *

UNITED STATES PATENT AND TRADEMARK OFFICE
CERTIFICATE OF CORRECTION

PATENT NO. : 6,673,245 B2
DATED : January 6, 2004
INVENTOR(S) : Nasser et al.

It is certified that error appears in the above-identified patent and that said Letters Patent is hereby corrected as shown below:

Title page,
Item [57], ABSTRACT,
Line 3, "characterized from" should be -- characterized by --.

Column 1,
Line 19, "This is invention relates to" should be -- This invention relates to --.

Column 2,
Line 30, "the impurities, continue to be present in" should be -- the impurities continue to be present in --.
Line 46, "FIG. 4 show the stages of" should be -- FIG. 4 shows the stages of --.
Line 59, "the Applicant developed a" should be -- the Applicants developed a --.

Column 3,
Line 52, "and move form one place to another" should be -- and move from one place to another --.

Column 4,
Line 49, "the Applicant developed a perfected" should be -- the Applicants developed a perfected --.

Column 5,
Line 16, "Non-celuloic carbohydrates" should be -- Non-celluloic carbohydrates --.
Line 35, "7.5 - 3.5" should be -- 7.5 - 8.5 --.

Column 6,
Lines 9 and 29, "The Applicant developed" should be -- The Applicants developed --.

Column 7,
Line 56, "Effluent Acetic Acid" should be -- *Effluent Acetic Acid* --.
Line 63, "the current that fees the" should be -- the current that feeds the --.
Line 66, "Batch" should be -- *Batch* --.

Column 8,
Line 5, "diminishes with the trail progress," should be -- diminishes with the trial progress, --.
Line 9, "Modified Batch" should be -- *Modified Batch* --.
Line 19, "Concentrate" should be -- *Concentrate* --.
Line 24, "Concentration by Polarization" should be -- *Concentration by Polarization* --.
Line 37, "Differential of the Pressure on the Cartridge Filter" should be -- *Differential of the Pressure on the Cartridge Filter* --.

UNITED STATES PATENT AND TRADEMARK OFFICE
CERTIFICATE OF CORRECTION

PATENT NO. : 6,673,245 B2
DATED : January 6, 2004
INVENTOR(S) : Nasser et al.

It is certified that error appears in the above-identified patent and that said Letters Patent is hereby corrected as shown below:

Column 8 (cont'd),
Line 49, "Element" should be -- *Element* --.
Line 58, "Permeated Flow" should be -- *Permeated Flow* --.
Line 62, "Feeding Flow to the Module" should be -- *Feeding Flow to the Module* --.
Line 66, "Hydrolysis Degree" should be -- *Hydrolysis Degree* --.

Column 9,
Line 1, "used by the Applicant" should be -- used by the Applicants --.
Line 10, "Material" should be -- *Material* --.
Line 11, "Method" should be -- *Method* --.
Line 19, "Commentary" should be -- *Commentary* --.
Line 24, "Result" should be -- *Result* --.
Line 26, "Membrane" should be -- *Membrane* --.
Line 41, "Module" should be -- *Module* --.
Line 46, "exit opening form the concentration," should be -- exit opening from the concentration, --.
Line 51, "Permeate" should be -- *Permeate* --.
Line 55, "Operation Pressure" should be -- *Operation Pressure* --.
Line 62, "Osmotic Pressure" should be -- *Osmotic Pressure* --.

Column 10,
Line 5, "Volumetric Reduction" should be -- *Volumetric Reduction* --.
Line 25, "in order o carry out this stage," should be -- in order to carry out this stage --.
Line 36, "Flow Test" should be -- *Flow Test* --.
Line 46, 65, "Pilot Unit" should be -- *Pilot Unit* --.
Line 47, "constituted of by a feed set," should be -- constituted of a feed set, --.
Line 65, "Pilot Unit" should be -- *Pilot Unit* --.
Line 66, "effluent Acetic Acid" should be -- *effluent Acetic Acid* --.

Column 11,
Line 3, "Modules" should be -- *Modules* --.
Line 4, "Elements of membranes" should be -- *Elements of membranes* --.
Lines 5, 33, 43-44, 50-51 and 62, "Pilot Unit" should be -- *Pilot Unit* --.
Line 11, "effluent Acetic Acid" should be -- *effluent Acetic Acid* --.
Line 12, "Flow Test" should be -- *Flow Test* --.
Lines 17, 21 and 62, "Applicant" should be -- Applicants --.
Lines 18-19, "Hydrolysis Degree" should be -- *Hydrolysis Degree* --.
Line 27, "Pressure, ... and Feed Flow to the Module" should be -- *Pressure, ... and Feed Flow to the Module* --.
Line 29, "Pilot Unit, ... Permeated Flow" should be -- *Pilot Unit, ... Permeated Flow* --.
Lines 31 and 39, "Hydrolysis Degree" should be -- *Hydrolysis Degree* --.

UNITED STATES PATENT AND TRADEMARK OFFICE
CERTIFICATE OF CORRECTION

PATENT NO. : 6,673,245 B2
DATED : January 6, 2004
INVENTOR(S) : Nasser et al.

It is certified that error appears in the above-identified patent and that said Letters Patent is hereby corrected as shown below:

Column 11 (cont'd),
Line 36, "Module), the Volumetric Reduction" should be -- *Module), the Volumetric Reduction* --.
Line 37, "Permeated Flow" should be -- *Permeated Flow* --.
Lines 40, 42, 46 and 49, "Volumetric Reduction" should be -- *Volumetric Reduction* --.
Line 40, "process is effective, event with the elevated Volumetric Reduction" should be -- *process is effective, even with the elevated Volumetric Reduction* --.
Line 44, "Batch" should be -- *Batch* --.
Lines 47-48 and 53, "Concentration by Polarization" should be -- *Concentration by Polarization* --.
Line 54, "Permeated Flow in the Module" should be -- *Permeated Flow in the Module* --.
Lines 54-55, "Element" should be -- *Element* --.
Line 64, "effluent Acetic Acid; the Permeate" should be -- *effluent Acetic Acid; the Permeate* --.
Lines 66-67, "Permeate" should be -- *Permeate* --.

Column 12,
Line 2, "Pilot Unit ... Elements" should be -- *Pilot Unit ... Elements* --.
Line 3, "Membranes" should be -- *Membranes* --.
Line 4, "Flow Test" should be -- *Flow Test* --.
Line 7, "Pressure" should be -- *Pressure* --.
Line 8, "Feed Flow to the Module" should be -- *Feed Flow to the Module* --.
Lines 9 and 13, "Pilot Unit" should be -- *Pilot Unit* --.
Lines 10, 62 and 66, "Hydrolysis Degree" should be -- *Hydrolysis Degree* --.
Line 14, "Module" should be -- *Module* --.
Line 17, "Modified Batch" should be -- *Modified Batch* --.
Line 35, "Operation Pressure" should be -- *Operation Pressure* --.
Lines 40, 53-54 and 64-65, "Concentration by Polarization" should be -- *Concentration by Polarization* --.
Line 58, "in the case descried," should be -- in the case described --.

Column 13,
Lines 3, 9-10, 33-34, 37 and 59, "Hydrolysis Degree" should be -- *Hydrolysis Degree* --.
Lines 4-5 and 9, "Operation Pressure" should be -- *Operation Pressure* --.
Line 9-10, "Hydrolysis Degree in the Permeate" should read -- *Hydrolysis Degree in the Permeate* --.
Line 18, "effluent Acetic Acid" should be -- *effluent Acetic Acid* --.
Lines 20 and 46, "Batch" should be -- *Batch* --.
Lines 24, 31 and 60-61, "Volumetric Reduction" should be -- *Volumetric Reduction* --.
Lines 25-26, "effluent Acetic Acid was 30.4% in weight" should be -- *effluent Acetic Acid was 30.4 % in weight* --.

UNITED STATES PATENT AND TRADEMARK OFFICE
CERTIFICATE OF CORRECTION

PATENT NO. : 6,673,245 B2
DATED : January 6, 2004
INVENTOR(S) : Nasser et al.

It is certified that error appears in the above-identified patent and that said Letters Patent is hereby corrected as shown below:

Column 13 (contin.),
Lines 27 and 52, "Flow Test" should be -- *Flow Test* --.
Lines 30 and 55, "Module" should be -- *Module* --.
Line 42, "Concentration by Polarization" should be -- *Concentration by Polarization* --.
Line 51, "effluent Acetic Acid was 29.6% in weight" should be -- *effluent Acetic Acid was 29.6% in weight* --.

Column 14,
Lines 1, 5, 9, 21, 42, 44 and 57, "Hydrolysis Degree" should be -- *Hydrolysis Degree* --.
Line 3, "Volumetric Reduction" should be -- *Volumetric Reduction* --.
Lines 13-14 and 50-51, "Concentration by Polarization" should be -- *Concentration by Polarization* --.
Lines 22 and 27, "Batch" should be -- *Batch* --.
Line 23, "Modified Batch" should be -- *Modified Batch* --.
Lines 24-25, "effluent Acetic Acid" should be -- *effluent Acetic Acid* --.
Lines 29-30, "effluent Acetic Acid from 28.5%" should be -- *effluent Acetic Acid from 28.5%* --.
Line 33, "Flow Test" should be -- *Flow Test* --.
Line 36, "Module" should be -- *Module* --.
Lines 38-39, "Volumetric Reduction ... Volumetric Reduction" should be -- *Volumetric Reduction Volumetric Reduction* --.
Lines 55-56 and 67, "Pilot Unit" should be -- *Pilot Unit* --.

Column 15,
Line 4, "monitoring, from 4970 liters of effluent Acetic Acid" should be -- monitoring; from 4970 liters of effluent Acetic Acid --.
Line 7, "Flow Test" should be -- *Flow Test* --.
Line 10, "Module" should be -- *Module* --.
Lines 12 and 14, "Volumetric Reduction" should be -- *Volumetric Reduction* --.
Lines 17, 20 and 28, "Hydrolysis Degree" should be -- *Hydrolysis Degree* --.
Lines 22-23, 33 and 63-64, "Differential of Pressure on the Cartridge Filter" should be -- *Differential of Pressure on the Cartridge Filter* --.
Line 38, "Concentration by Polarization" should be -- *Concentration by Polarization* --.
Line 45, "Pilot Unit" should be -- *Pilot Unit* --.

Column 16,
Lines 1 and 35, "Batch" should be -- *Batch* --.
Lines 3 and 37, "effluent Acetic Acid" should be -- *effluent Acetic Acid* --.
Lines 6 and 41, "Flow Test" should be -- *Flow Test* --.
Lines 8-9, 10, 43 and 44, "Volumetric Reduction" should be -- *Volumetric Reduction* --.
Lines 11, 18-19, 46 and 53-54, "Differential Pressure on the Cartridge Filter" should be -- *Differential Pressure on the Cartridge Filter* --.

UNITED STATES PATENT AND TRADEMARK OFFICE
CERTIFICATE OF CORRECTION

PATENT NO. : 6,673,245 B2
DATED : January 6, 2004
INVENTOR(S) : Nasser et al.

It is certified that error appears in the above-identified patent and that said Letters Patent is hereby corrected as shown below:

Column 16 (contin.),
Lines 14, 20, 47-48 and 50, "Hydrolysis Degree" should be -- *Hydrolysis Degree* --.
Line 38, "Module" should be -- *Module* --.
Line 59, "Operation Pressure" should be -- *Operation Pressure* --.

Column 17,
Line 19, "period to time" should be -- period of time --.
Line 31, "Pilot Unit" should be -- *Pilot Unit* --.
Line 33, "Batch" should be -- *Batch* --.
Line 35, "effluent Acetic Acid" should be -- *effluent Acetic Acid* --.
Lines 37-38, 45 and 46, "Volumetric Reduction" should be -- *Volumetric Reduction* --.
Line 41, "Module" should be -- *Module* --.
Line 43, "Flow Test" should be -- *Flow Test* --.
Lines 47-48, "Differential Pressure on the Cartridge Filter" should be -- *Differential Pressure on the Cartridge Filter* --.
Lines 50 and 52, "Hydrolysis Degree" should be -- *Hydrolysis Degree* --.
Lines 61-62, "Operation Pressure" should be -- *Operation Pressure* --.

Column 18,
Lines 20 and 32, "Flow Test" should be -- *Flow Test* --.
Line 22, "Batch" should be -- *Batch* --.
Line 24, "effluent Acetic Acid" should be -- *effluent Acetic Acid* --.
Line 30, "Module" should be -- *Module* --.
Lines 34, 36 and 42-43, "Volumetric Reduction" should be -- *Volumetric Reduction* --.
Lines 37-38 and 47-48, "Differential Pressure on the Cartridge Filter" should be -- *Differential Pressure on the Cartridge Filter* --.
Lines 42 and 54, "Hydrolysis Degree" should be -- *Hydrolysis Degree* --.
Line 49, "reduction tht is also abrupt" should be -- reduction that is also abrupt --.
Line 52, "The trail was interrupted at 90% VR," should be -- The trial was interrupted at 90% VR, --.
Line 60, "Operation Pressure" should be -- *Operation Pressure* --.

Column 19,
Lines 35 and 39, "Pilot Unit" should be --*Pilot Unit* --.
Line 41, "Batch" should be -- *Batch* --.
Lines 42-43, "effluent Acetic Acid" should be -- *effluent Acetic Acid* --.
Line 47, "Module" should be -- *Module* --.
Line 50, "Flow Test" should be -- *Flow Test* --.
Lines 52 and 54, "Volumetric Reduction" should be -- *Volumetric Reduction* --.
Lines 55-56 and 58-59, "Differential of the Pressure on the Cartridge Filter" should be -- *Differential of the Pressure on the Cartridge Filter* --.
Lines 56-57 and 65, "Hydrolysis Degree" should be -- *Hydrolysis Degree* --.

UNITED STATES PATENT AND TRADEMARK OFFICE
CERTIFICATE OF CORRECTION

PATENT NO. : 6,673,245 B2
DATED : January 6, 2004
INVENTOR(S) : Nasser et al.

It is certified that error appears in the above-identified patent and that said Letters Patent is hereby corrected as shown below:

Column 20,
Line 2, "rpecipitated, even after" should be -- precipitated, even after --.
Lines 7 and 52, "Operation Pressure" should be -- *Operation Pressure* --.
Line 19, "Batch" should be -- *Batch* --.
Lines 20-21, "effluent Acetic Acid" should be -- *effluent Acetic Acid* --.
Line 25, "Module" should be -- *Module* --.
Line 29, "Flow Test" should be -- *Flow Test* --.
Lines 31, 33 and 64, "Volumetric Reduction" should be -- *Volumetric Reduction* --.
Lines 34 and 37, "Differential of the Pressure Cartridge Filter" should be -- *Differential of the Pressure Cartridge Filter* --.
Lines 35 and 43, "Hydrolysis Degree" should be -- *Hydrolysis Degree* --.

Column 21,
Lines 4 and 52, "Batch" should be --*Batch* --.
Lines 5-6 and 53-54, "effluent Acetic Acid" should be -- *effluent Acetic Acid* --.
Lines 11 and 59, "Module" should be -- *Module* --.
Lines 13 and 61, "Flow Test" should be -- *Flow Test* --.
Lines 15, 17, 63 and 65, "Volumetric Reduction" should be -- *Volumetric Reduction* --.
Lines 18-19, 21-22 and 66, "Differential of the Pressure on the Cartridge Filter" should be -- *Differential of the Pressure on the Cartridge Filter* --.
Lines 19-20, 28-29 and 67, "Hydrolysis Degree" should be -- *Hydrolysis Degree* --.
Lines 38-39, "Operation Pressure" should be -- *Operation Pressure* --.

Column 22,
Lines 2, 58-59 and 63, "Differential of the Pressure Cartridge on the Filter" should be -- *Differential of the Pressure Cartridge on the Filter* --.
Lines 7, 59-60 and 67, "Hydrolysis Degree" should be -- *Hydrolysis Degree* --.
Line 15, "of the concetrated solution," should be -- of the concentrated solution, --.
Line 17, "Operation Pressure" should be -- *Operation Pressure* --.
Lines 21 and 43, "Pilot Unit" should be -- *Pilot Unit* --.
Line 21, "Batch" should be -- *Batch* --.
Lines 43-44, "Modified Batch" should be -- *Modified Batch* --.
Line 46, "effluent Acetic Acid" should be -- *effluent Acetic Acid* --.
Line 51, "Module" should be -- *Module* --.
Line 53, "Flow Test" should be -- *Flow Test* --.
Lines 55 and 57, "Volumetric Reduction" should be -- *Volumetric Reduction* --.
Line 67, "Hydrolysis Degree" should be -- *Hydrolysis Degree* --.

UNITED STATES PATENT AND TRADEMARK OFFICE
CERTIFICATE OF CORRECTION

PATENT NO. : 6,673,245 B2
DATED : January 6, 2004
INVENTOR(S) : Nasser et al.

It is certified that error appears in the above-identified patent and that said Letters Patent is hereby corrected as shown below:

Column 23,
Line 5, "desribed in Example 14" should be -- described in Example 14 --.
Line 10, "Osmotic Pressure" should be -- *Osmotic Pressure* --.
Lines 23-24, "Differential of the Pressure on the Cartridge Filter" should be
-- *Differential of the Pressure on the Cartridge Filter* --.
Line 26, "Batch" should be -- *Batch* --.
Line 28, "effluent Acetic Acid" should be -- *effluent Acetic Acid* --.
Line 33, "Module" should be -- *Module* --.
Line 35, "Flow Test" should be -- *Flow Test* --.
Lines 37 and 39, "Volumetric Reduction" should be -- *Volumetric Reduction* --.

Columns 23-24,
Line 40-1, "Differential of the Pressure on the Cartridge Filter" should be -- *Differential on the Pressure of the Cartridge Filter* --.

Column 24,
Lines 1-2 and 18-19, "Hydrolysis Degree" should be -- *Hydrolysis Degree* --.
Lines 4-5 and 13-14, "Differential of the Pressure on the Cartridge Filter" should be
-- *Differential of the Pressure on the Cartridge Filter* --.

Column 25,
Lines 55-57, "in the process of obtaining cellulose acetate, wherein said process starting with" should be -- in the process of obtaining cellulose acetate wherein starting with --.

Columns 25-26
Table 1, Example 15, "6.5 g (in in initial process) " should be -- 6.5 g (in the initial process) --.

UNITED STATES PATENT AND TRADEMARK OFFICE
CERTIFICATE OF CORRECTION

PATENT NO.    : 6,673,245 B2
DATED         : January 6, 2004
INVENTOR(S)   : Nasser et al.

It is certified that error appears in the above-identified patent and that said Letters Patent is hereby corrected as shown below:

Column 26,
Table 1, Example 15, Observations column, "concentrate Reached osmotic pressure" should be -- concentrate reached osmotic pressure --.
Lines 54-55, "at least one of the surface-active agents" should be -- being that at least one of the surface-active agents --.

Signed and Sealed this

Fifth Day of April, 2005

JON W. DUDAS
*Director of the United States Patent and Trademark Office*